United States Patent [19]

Rado et al.

[11] Patent Number: 5,508,689
[45] Date of Patent: Apr. 16, 1996

[54] CONTROL SYSTEM AND METHOD UTILIZING GENERIC MODULES

[75] Inventors: William G. Rado, Ann Arbor; Shaun S. Devlin, Bloomfield Hills, both of Mich.

[73] Assignee: Ford Motor Company, Dearborn, Mich.

[21] Appl. No.: 292,475

[22] Filed: Aug. 18, 1994

Related U.S. Application Data

[63] Continuation-in-part of Ser. No. 896,770, Jun. 10, 1992, abandoned.

[51] Int. Cl.$^6$ .................................................. G05B 23/02
[52] U.S. Cl. ............................ 340/825.06; 307/10.1
[58] Field of Search .................. 340/825.06, 825.22, 340/825.23, 426, 425.5, 310.01; 307/10.1, 9.1; 370/85.1, 85.13; 364/474.11, 424.01

[56] References Cited

U.S. PATENT DOCUMENTS

| | | | |
|---|---|---|---|
| 3,544,803 | 12/1970 | Taylor | 307/10 |
| 3,648,057 | 3/1972 | Sognefest et al. | 307/10 R |
| 3,745,419 | 7/1973 | Wright | 317/137 |
| 3,864,578 | 2/1975 | Lackey . | |
| 4,028,620 | 6/1977 | Kitagawa et al. | 324/51 |
| 4,034,271 | 7/1977 | Palazzetti et al. | 361/332 |
| 4,055,772 | 10/1977 | Leung | 307/10 R |
| 4,085,403 | 4/1978 | Meier et al. | 340/168 R |
| 4,232,231 | 11/1980 | Reed | 307/10 R |
| 4,348,726 | 9/1982 | Igarashi et al. | 364/424 |
| 4,403,155 | 9/1983 | Aoki et al. | 307/10 R |
| 4,594,571 | 6/1986 | Neuhaus et al. | 340/52 F |
| 4,630,043 | 12/1986 | Haubner et al. | 340/825.57 |
| 4,652,853 | 3/1987 | Tagami et al. | 340/52 F |
| 4,739,183 | 4/1988 | Tokura et al. | 307/9 |
| 4,744,218 | 5/1988 | Edwards et al. | 340/825.06 |
| 4,745,596 | 5/1988 | Sato | 370/85 |
| 4,794,269 | 12/1988 | Kawata et al. | 307/10 R |
| 4,845,708 | 7/1989 | herrmann, Jr., et al. | 370/85 |
| 4,858,072 | 8/1989 | Chall, Jr. | 361/388 |
| 4,862,365 | 8/1989 | Onesti | 364/424.01 |

(List continued on next page.)

FOREIGN PATENT DOCUMENTS

| | | |
|---|---|---|
| 0051849 | 11/1981 | European Pat. Off. . |
| 0388107 | 3/1990 | European Pat. Off. . |
| 0445958 | 2/1991 | European Pat. Off. . |
| 0475406 | 9/1991 | European Pat. Off. . |
| 0482953 | 10/1991 | European Pat. Off. . |

OTHER PUBLICATIONS

"Multiplexed Buses Unravel Auto Wiring", Electronic Design, Aug. 8, 1991, pp. 83–90.

SAE Recommended Practice, Class B Data Communication Network Interface—SAE J1850, Nov., 1988, pp. 20.165–20.169.

"Automakers Move To Multiplexing", Machine Design, Jun. 8, 1989, No. 11, pp. 102–108.

"Multiplexed Development Strategy: Part 1", Automotive Engineering, Sep., 1990, No. 9, pp. 63–65.

*Primary Examiner*—Kenneth A. Wieder
*Assistant Examiner*—Edwin C. Holloway, III
*Attorney, Agent, or Firm*—Mark L. Mollon; Roger L. May

[57] ABSTRACT

A control system and method for motor vehicles uses generic control modules which communicate over a vehicle trunkline to accommodate applications of varying functional content and complexity. The vehicle trunkline provides power distribution and a number of communication channels for the various generic control modules which include controller modules, interface modules, and combination controller/interface modules. Each generic control module is connected to the vehicle trunkline via a standardized connector. The combination modules and interface modules are connected to system actuators and sensors with relatively short, simple overlay wiring. The system allows distributed computation for the control of functions and utilizes communication networks to reduce the number of conductors required while increasing the utilization of processing capabilities.

14 Claims, 4 Drawing Sheets

U.S. PATENT DOCUMENTS

| | | | |
|---|---|---|---|
| 4,864,568 | 9/1989 | Sato et al. | 371/8.2 |
| 4,885,691 | 12/1989 | Ishii et al. | 364/424.04 |
| 4,924,418 | 5/1990 | Bachman et al. | 364/550 |
| 4,926,158 | 5/1990 | Zeigler | 340/310 A |
| 4,942,571 | 7/1990 | Möller et al. | 370/85.1 |
| 4,956,561 | 9/1990 | Tamer | 307/10.1 |
| 5,252,899 | 10/1993 | Kawamura et al. | 364/474.11 |

CONTROL SYSTEM AND METHOD UTILIZING GENERIC MODULES

CROSS REFERENCE TO RELATED APPLICATION

This application is a continuation-in-part of currently U.S. patent application Ser. No. 07/896,770 filed Jun. 10, 1992, now abandoned, entitled "Generic Control System with Chip Sets" which is assigned to the assignee of the present invention.

TECHNICAL FIELD

The present invention relates to a system and method for effecting control of vehicle systems, subsystems, and accessories utilizing generic modules connected via a simplified wiring harness.

BACKGROUND ART

As government regulations and consumer demands continue to motivate improvements in vehicle performance, more sophisticated control of vehicles and vehicle accessories is necessary. Real-time and near real-time control of vehicle systems and subsystems necessitates a reliable control system to gather and process a significant amount of information for generation and delivery of the appropriate control commands. For example, control of systems and subsystems such as the engine, transmission, anti-lock brakes, active suspension, and the like, requires relatively high-speed communication of information gathered from sensors to a processing unit. The processing unit analyzes the information and communicates the necessary control signals to various actuators to effect control of the system.

Various vehicle accessories such as power seats, power windows, power mirrors, an entertainment system, turn indicators, windshield wipers, climate control system, and the like, have one or more analogous control systems. Regardless of the complexity or the number of control systems, they all share common characteristics, such as a generalized control function which may be implemented by a relatively small number of generic building blocks. The control functions include gathering information, analyzing the information, and acting on the information to effect control of the system. The basic building blocks include sensors, actuators, and processing units.

Traditionally, the complexity and criticality (or lack thereof) of the various systems and accessories found in automotive applications required a number of dedicated processing units. The vehicle control system was essentially an aggregation of a number of stand-alone control systems with a minimum amount of inter-system communication. Systems and accessories were added to the vehicle in a piecemeal fashion as dictated by consumer demand and the capacity of existing cost-effective control systems. Often, the only common link between various control systems was the power provided by the vehicle battery or alternator.

The various sensors, actuators, and processors of traditional vehicle systems are connected by point-to-point conductors bundled in a vehicle wiring harness which also provides power distribution about the vehicle. As additional control systems and accessories are added, the wiring harness becomes more and more complex. This increased complexity often results in difficulty during the original assembly of the vehicle and in any subsequent diagnosis and repair of the vehicle electrical system. Furthermore, the addition of an "after-market" system or accessory to an existing vehicle is often an arduous task.

The continuing evolution of microelectronics and microprocessors is leading to more sophisticated and reliable processing units capable of integrating control of various vehicle systems and accessories. While such integration often improves the flexibility and coordination of control among various vehicle systems, it often requires the allocation of significant resources in developing customized electronic integrated circuits to address the needs of a particular application. Furthermore, most vehicles having integrated control systems still utilize a customized wiring harness having a number of conductors for point-to-point electrical communication among the various elements.

However, the prior art lacks a single set of electronic integrated circuit chips (microprocessors, microcomputers, input/output interfaces) which can accommodate various input and output signal types over the full range of complexity typically encountered in vehicular applications. As a result, there continues to be a proliferation of integrated circuits handling the input signals, information and control processing, and the output signals, with varying levels of integration. In addition, redundancy for critical control tasks, parallel processing, and other design parameters often lead to significantly more expensive implementations than desirable.

Recently, a number of approaches involving multiplexing of vehicle communications have been advanced to reduce the complexity of the wiring harness while integrating control of various vehicle systems. However, the hostile operating environment of a typical vehicle poses a number of problems in developing a reliable high-speed communication system. For such applications, a communication system must have sufficient reliability and bandwidth (or bit rate) to accommodate real-time control of systems which are essential to operator safety. The system must also be sufficiently immune to electromagnetic interference (EMI or noise) generated by the operation of various switches, motors and other electronic circuits. As is known, this typically requires some physical separation between power distribution lines and control signal delivery lines. Additionally, the system must be cost-effective to implement when compared to the relatively inexpensive, although cumbersome, traditional vehicle wiring harness.

In an effort to categorize various requirements of vehicle communication systems, the Society of Automotive Engineers (SAE) has divided automotive communication requirements into three classes denoted Class A, Class B, and Class C systems. Class C specifies the highest performance in terms of communication speed and accuracy while Class A refers to relatively low-speed signals which may be utilized for non-critical control of systems and accessories. A Class C communication system, having a data rate in excess of 125 kilobits per second (kbps) with a latency time of less than 5 milliseconds (mS) is necessary for real-time control of critical systems such as the powertrain or anti-lock braking system. Class B systems are often utilized for diagnostic functions, either on-line or off-line, and other information-sharing functions.

A number of communication system architectures or topologies may be utilized with a number of communication protocols to implement a multiplexed vehicular control system. A star topology has a central controller connected to various satellite controllers. This topology has the disadvantage that if the central controller malfunctions, the satellite controllers cannot communicate with one another. A linear bus topology accommodates expandability and configuration flexibility. This architecture allows controllers to communicate with one another or with less sophisticated modules while accommodating configuration modifications. Thus, the addition or elimination of a module does not significantly impact the physical or logical connections of the various modules communicating on the system.

A ring topology has a number of controllers connected in a ring arrangement. The communication network may pass through each controller or each controller may simply "attach" to the ring which acts as a communications bus. A ring topology using bus connections has built-in fault tolerance since if any single segment of the ring connection is broken, the ring structure degenerates to a linear bus structure so the various controllers can still communicate.

The various network architectures may utilize a number of communication protocols depending upon the particular application. For real-time control of critical systems, such as those encountered in vehicular applications, a deterministic communication protocol is desired. A deterministic protocol assures that critical information and control signals can be communicated within a predetermined period of time, i.e. a particular controller will not have to wait longer than that time to communicate when the network is busy with other communications. However, these protocols still have an associated finite delay time and so network control is not as fast as direct point-to-point control.

Communication protocols employing a prioritized deterministic multiple-access strategy are often used in vehicular applications. These protocols provide for non-destructive arbitration among communicating modules when contention for network access exists. For example, contention exists when two (2) or more modules request network access at the same time. An arbitration strategy determines which module will be allowed to communicate over the network. A prioritized non-destructive arbitration strategy, such as described by the SAE J1850 recommended practice, preserves the highest priority message so that it is communicated in a timely manner. Such a protocol accommodates sharing of communication resources among peer modules which control systems and accessories having disparate priorities, such as control of the vehicle engine and control of the vehicle entertainment system.

SUMMARY OF THE INVENTION

It is an object of the present invention to provide a system and method for integrated control of a vehicle utilizing generic control modules.

In carrying out this and other objects of the present invention, a system is provided which utilizes generic control modules for controlling various vehicle subsystems and accessories which communicate via a simplified wiring harness having at least one power distribution trunk and a multiplicity of communication network trunks. The generic control modules include controllers, interface units, and combinations thereof which are connected to the wiring harness through standardized connectors.

A method is also provided for use with a system constructed in accordance with the present invention.

In the preferred embodiment, the system and method of the present invention provide for a vehicle electrical control system including a simplified wiring harness for power distribution and signal communication. The power distribution lines include filtered ("clean") power in addition to unfiltered ("dirty") power which originate at a vehicle power source, such as a battery or alternator, and extend throughout strategic locations about the vehicle. The communication lines accommodate SAE Class A, Class B, and Class C communications with each class having an associated pair of signal lines.

Generic control modules include controller modules, interface modules, and combined controller/interface modules which are coupled to the simplified wiring harness utilizing universal connectors. Short point-to-point overlay wiring is utilized to connect the various system sensors and actuators to the interface units or combined units.

The advantages accruing to the present invention are numerous. For example, the present invention facilitates the implementation of an arbitrary number of vehicle electronic control systems, having arbitrary complexity, into a single vehicle application. The use of generic control modules linked via a simplified wiring harness provides configuration flexibility to accommodate numerous vehicle applications independent of functional content or complexity. The generic control modules reduce part proliferation while providing an economy of scale since different vehicle applications utilize the same control modules, although in different numbers and combinations.

Another advantage of the present invention is the reduction in the number of long spans of point-to-point wiring commonly found in current vehicles. This is accomplished by strategic positioning of interface modules proximate to sensors and actuators and positioning of controller modules determined by required reaction times or by convenience of packaging.

A still further advantage of the present invention is that it provides for distributed computation of control functions. Algorithmic processing may be performed in a remote controller module which transmits commands to a local interface module or combination module. The local module is then responsible for executing the command and performing the real-time control tasks for various closed-loop feedback systems and is not subject to the delays imposed by communication over the network.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
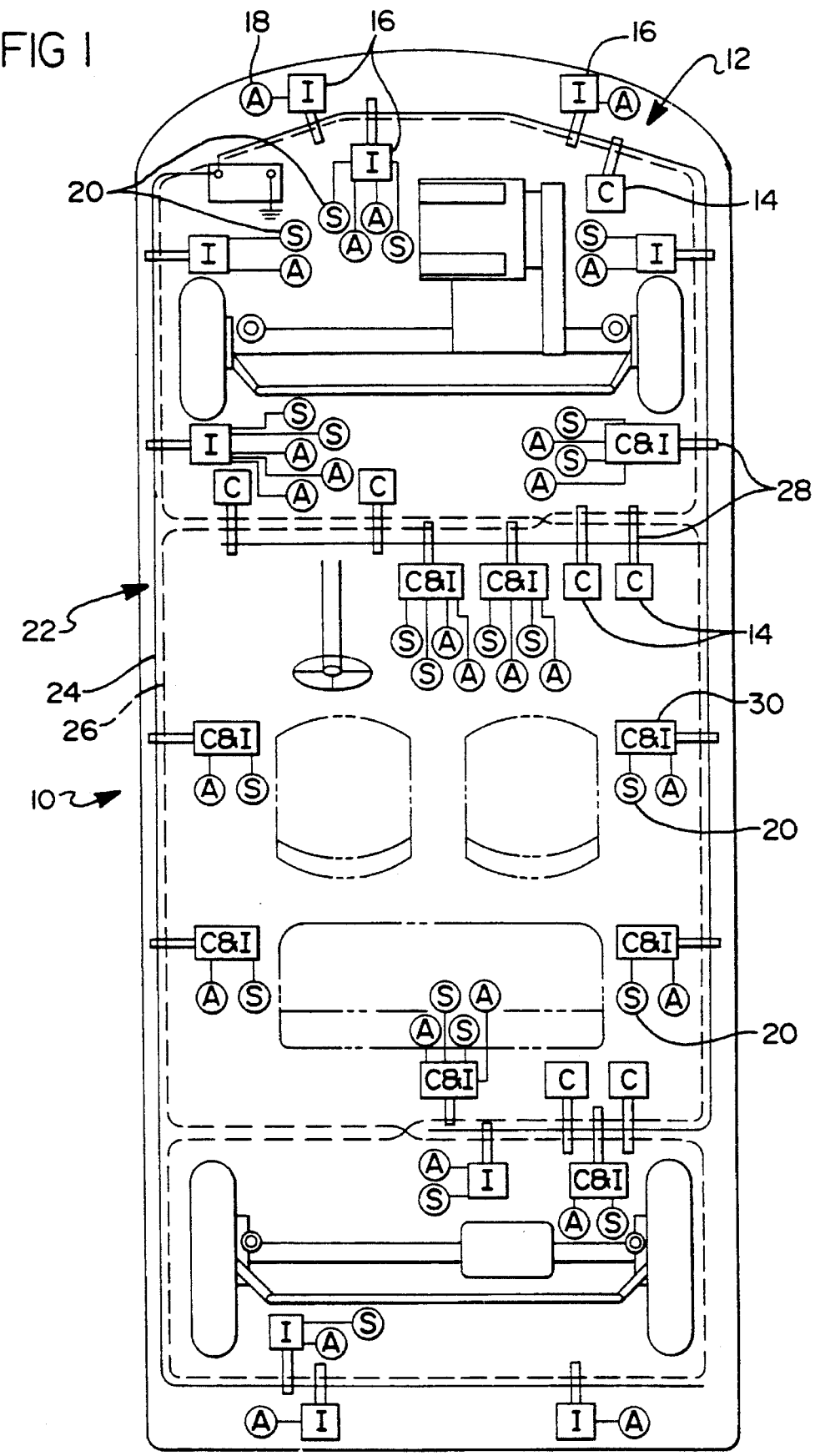
FIG. 1 is a diagrammatic plan view of a vehicle incorporating a representative control system according to the present invention.

Referring now to FIG. 1, a vehicle, indicated generally by reference numeral 10, includes a control system, indicated generally by reference numeral 12. In the preferred embodiment, control system 12 is an electrical control system. However, the present invention transcends the particular physical implementation of the communication channel of the control system and would be equally applicable to various alternative communication channels such as fiber optic means, or the like. Control system 12 incorporates a number of generic control modules, such as controller module 14, in communication with at least one interface module 16 (or a combination module 30) which is connected to various system actuators 18 and sensors 20. A vehicle trunkline, indicated generally by reference numeral 22, provides power distribution via power lines 24 and data communication via signal lines 26. Generic connectors 28, best illustrated in FIGS. 2 and 3, couple controller modules 14, interface modules 16, and combination modules 30 to vehicle trunkline 22.

Actuators 18 include any of a variety of motors, mechanisms, lights, or the like which are well known in the art and may be referred to generally as output devices. For example, actuators 18 may include a vehicle headlamp, a turn indicator, a fuel injector, an audio speaker, or the like. Similarly, sensors 20 include any of a variety of switches, transducers, or the like which may be generally referred to as input devices. Sensors 20 are operative to sense vehicle operating parameters and generate corresponding signals indicative of current operating conditions or a desired vehicle response. For example, sensors 20 may include a brake pedal sensor, a speed sensor, a temperature sensor, a volume control potentiometer, or the like.

FIG. 1 also illustrates representative locations for the control system components previously described. Preferably, trunkline 12 is the only part of the vehicle wiring harness which is to be embedded in or around the body sheet metal of the vehicle. The generic connectors 28 are preferably placed close enough to the actuators 18 and sensors 20 such that simple, short overlay wiring can be used to connect them to an associated interface module 16 or combination module 30. Thus, as the functional content of the vehicle changes, i.e. as optional systems or accessories are added or eliminated, the number and placement of the generic connectors 28 and generic control modules 14,16,30 may change, but the basic content and routing of trunkline 22 remains constant. This is a significant advantage of the present invention not attainable with prior art systems. Of course, various other component arrangements are possible which achieve this object without departing from the scope of the present invention.

The number, type, and placement of generic control modules in a particular vehicle application depends upon a number of system parameters. These parameters include the location density of sensors and actuators which have similar signal characteristics, the criticality of the system being controlled, and the required accessibility of a particular system to a vehicle operator or maintenance technician, among other factors. For example, the density of sensors and actuators is higher within the engine compartment and near the instrument panel than within the rearward portion of the vehicle. Thus, areas with higher densities typically require a greater number of generic control modules, especially interface modules, to accommodate the number and variety of signals which are generated or delivered to such areas.

It is important to note, however, that although the control system of the present invention allows strategic placement of generic control modules, the actual control function may be distributed among one or more remotely located controller (or combination) modules. The manner in which each control function is distributed depends upon the extent to which different control functions share information relative to the same actuators and sensors and also on the response time required for the control function. For example, in a vehicle with a load leveling feature, the proper height of the right rear of the vehicle may be determined by a remotely located controller module. The controller module would then send a levelling command to the appropriate combination module located proximate to its associated actuators and sensors. The local combination module then executes the levelling command by performing the necessary closed-loop control tasks so that the desired vehicle level is achieved. Since the combination module is located locally and communicates directly with the sensors and actuators, the network delay does not affect the response time of the real-time control tasks of the control function. This feature is explained in greater detail with reference to FIGS. 4 and 5 below.

The generic character of the control modules allows a particular control function to be performed by any convenient controller module or combination module. Thus, similar modules are interchangeable, i.e. the algorithmic processing tasks of a particular control function may be performed by any one or more control modules. This allows for parallel processing and redundancy as needed.

Figure 2:
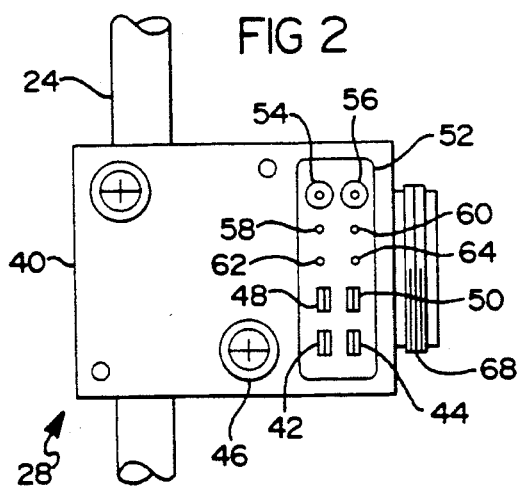
FIG. 2 is an enlarged side view of a typical connector as illustrated in the system of FIG. 1.

Referring now to FIG. 2, a top view of a generic connector 28 is shown. Each generic connector 28 includes a housing 40 having a channel adapted to receive a power line 24. Housing 40 includes a filtered power terminal 42, an unfiltered power terminal 44, and associated filtered and unfiltered ground terminals 48 and 50, respectively. A ground connection (unfiltered) may be provided in any convenient manner, such as by anchoring fastener 46 to the vehicle ground plane through a weld nut or the like. Housing 40 contains conventional electronic components (not shown) to provide an electrical connection and appropriate filtering between power line 24, ground fastener 46, and terminals 42, 44, 48, and 50.

Figure 3:
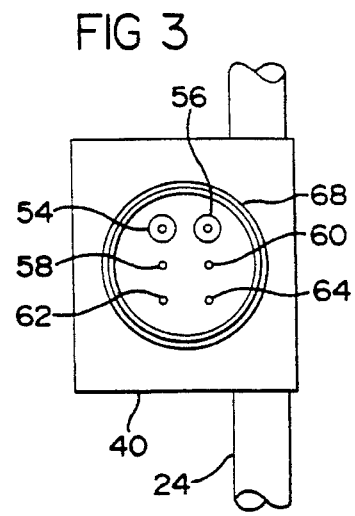
FIG. 3 is an end view of the connector illustrated in FIG. 2.

With continuing reference to FIG. 2, terminals 42, 44, 48, and 50 are disposed within a coupling portion 52 of housing 40. Coupling portion 52 is operative to provide structural support between housing 40 and a mating generic control module (not shown). Coupling portion 52 also includes one or more terminals for providing a connection to communication signal lines 26. In the preferred embodiment, housing 40 includes two (2) SAE Class C network terminals 54,56, two (2) SAE Class B network terminals 58,60, and two (2) SAE Class A network terminals 62,64. Each of the terminals 54–64 extend through housing 40 and connector 68 for connection to signal lines 26 (best shown in FIG. 1) as illustrated in FIG. 3.

As shown, the preferred embodiment accommodates a multiplicity of different communication protocols utilizing separate physical media to facilitate the integration of a variety of diverse signal types and control functions into a few generic modules. However, as the costs associated with high-speed communication network components decreases, it may be possible to reduce the number of discrete communication channels while still achieving the advantages and objects of the present invention. For example, non-critical control functions could be executed over an SAE Class C communication network in addition to the real-time, critical control functions. This is not currently cost-effective due to the cost differential between an SAE Class A network node and an SAE Class C network node.

Figure 4:
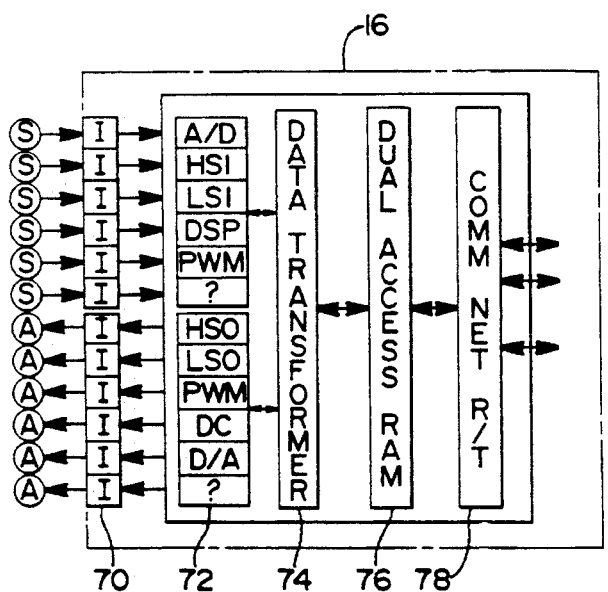
FIG. 4 is a diagrammatic illustration of a typical interface module having associated sensors and actuators.

Referring now to FIG. 4, a diagrammatic illustration of interface module 16 according to the present invention is shown. Interface module 16 accommodates a number of input signal types received from sensors 20 through associated input/output (I/O) ports 70. Similarly, interface module 16 accommodates a number of output signal formats which are communicated to the various actuators 18 through associated I/O ports 70. Each I/O port 70 includes conventional signal conditioning circuitry (not shown) to appropriately condition the signals and to protect interface module 16 from damaging voltage or current transients.

With continuing reference to FIG. 4, signal converters 72 represent various conventional electronic circuitry utilized to convert digital signals to and from various signaling formats typically found in vehicular applications. For example, converters 72 may include analog-to-digital (A/D) converters, digital-to-analog (D/A) converters, high-speed input/output circuitry (HSI and HSO), low-speed input/output circuitry (LSI and LSO), digital signal processing circuitry (DSP), pulse-width modulation circuitry (PWM), direct current (DC) driving circuitry, or the like. Preferably, I/O ports 70 are configurable so as to allow modification of the number and type of inputs or outputs depending upon the particular sensor/actuator density in each location within the vehicle. Thus, interface module 16 has built-in flexibility to handle a predetermined number of all input and output types.

As also shown in FIG. 4, data transformer 74 preferably includes a microprocessor and memory (not shown), such as read-only memory (ROM), and is in electrical communication with the converters 72. Data transformer 74 is operative to access a dual-access memory buffer, such as dual-access RAM 76, and deliver data to appropriate converters 72 to energize associated actuators 18. In a similar fashion, data transformer 74 receives signals from sensors 20 through converters 72 and stores data representative of the received signals in dual-access RAM 76.

A communications network receiver/transmitter 78 is in communication with dual-access RAM 76 and also in communication with one or more physical communication channels, as indicated generally by the multiple arrows in FIG. 4. Receiver/transmitter 78 is operative to format the data being received or transmitted according to one or more predetermined communications protocols. Preferably, interface module 16 has two selectable modes of communication having different communication protocols. A link mode protocol is used to communicate between two (2) dedicated nodes which may be configured as stand-alone units. A network mode protocol is used for communications among a number of similar generic control modules.

Interface module 16 may be located proximate to various sensors and actuators in an independent housing. Alternatively, interface module 16 may be disposed within the same housing as a controller module 14 depending upon the particular application.

In summary, an interface module according to the present invention is operative to translate input signal information received from a variety of input signal sources and format that information for transmission across a serial communication channel to a controller module. An interface module also functions to receive information from a controller module over a serial communication channel and translate that information into the appropriate output signals.

Figure 5:
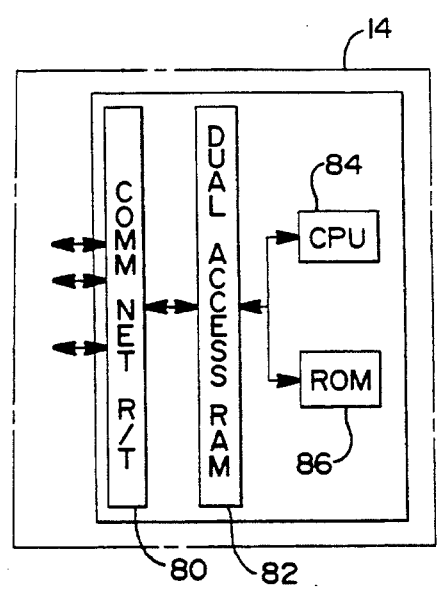
FIG. 5 is a diagrammatic illustration of a typical controller module according to the present invention.

Referring now to FIG. 5, a diagrammatic illustration of a controller module 14 is shown. Controller module 14 includes a communication network receiver/transmitter 80 which performs a similar function as receiver/transmitter 78 of interface module 16. A dual-access buffer, such as dual-access RAM 82, accommodates the transfer of information between the communication network and a central processing unit (CPU) 84 and a memory, such as ROM 86. Preferably, dual-access RAM 82, CPU 84, and ROM 86 are implemented on a single integrated circuit chip.

In operation, controller module 14 receives input information from a number of arbitrary input sources via vehicle trunkline 20 (shown in FIG. 1) which includes a serial communications line. Controller module 14 translates this information into a digital value which may be stored within dual-access RAM 82 or retransmitted to another controller module. CPU 84 uses the information placed in dual-access RAM 82 in executing a predetermined set of instructions stored in ROM 86 to generate appropriate control commands. The control commands are then stored in dual-access RAM 82 for transmission to the appropriate interface module over one or more communication networks. The information received, manipulated, and generated by controller module 14 may be used for control functions, diagnostic functions, reliability management functions, or to manage parallel processing, among myriad other functions.

Figure 6:
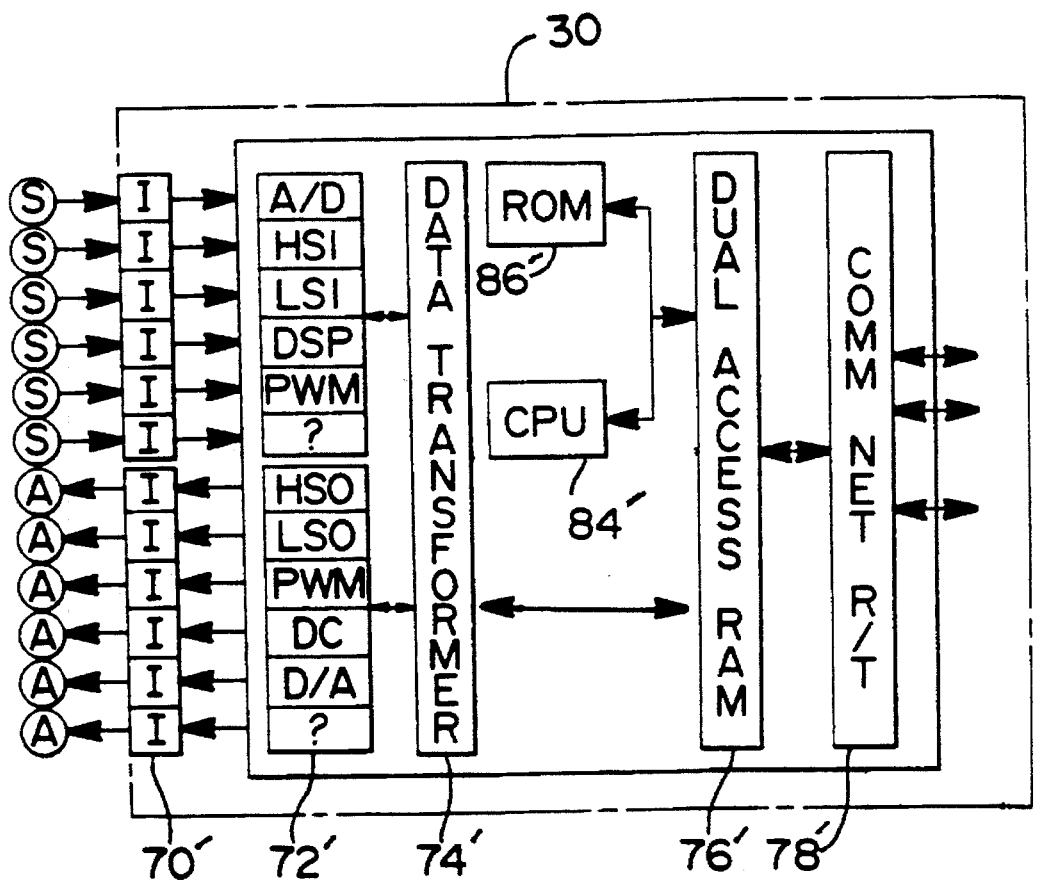
FIG. 6 is a diagrammatic illustration of a typical combination controller/interface module having associated sensors and actuators.

Referring now to FIG. 6, a diagrammatic illustration of a combination controller/interface module 30 is shown. The combination module 30 includes functional blocks similar to those previously described in reference to FIGS. 4 and 5 as indicated by the primed reference numerals. Combination module 30 performs similar functions as a controller module 14 and an interface module 16. However, some of the components are duplicated and may be eliminated since they are within the same module. Thus, only a single dual-access RAM 76' and a single communication network receiver/transmitter 78' are necessary.

The combination module 30 of FIG. 6 allows, control commands to be transmitted directly from CPU 84' through dual-access RAM 76' to data transformer 74'. This allows direct real-time control without considering the effects of communication delay imposed by a network. The communication network receiver/transmitter 78' is utilized to share information obtained from the local sensors with various other controller modules and combination modules on the vehicle trunkline. Similarly, commands issued by a remotely located generic control module which require real-time control may be executed by the local controller module. This arrangement also facilitates centralized diagnostics and data tracking since all the sensors and actuators of the vehicle may be interrogated from any node on the network.

Thus, a combination module may receive commands from a remote controller module and relay them to the appropriate actuators. Similarly, a combination module may receive information from attached sensors and transmit this information to a remote controller module which executes an associated control function. Thus, the control system of the present invention allows for distributed computation of control functions in addition to multiplexed communications between generic control modules. For example, a controller module or combination module may be located near the engine compartment since the sensor/actuator density is relatively high in this area. However, in addition to performing engine control functions, that controller module may be utilized to control geographically remote functions, such as controlling the operation of the turn indicators. This accommodates various packaging considerations while allowing improved utilization of processing resources.

Figure 7:
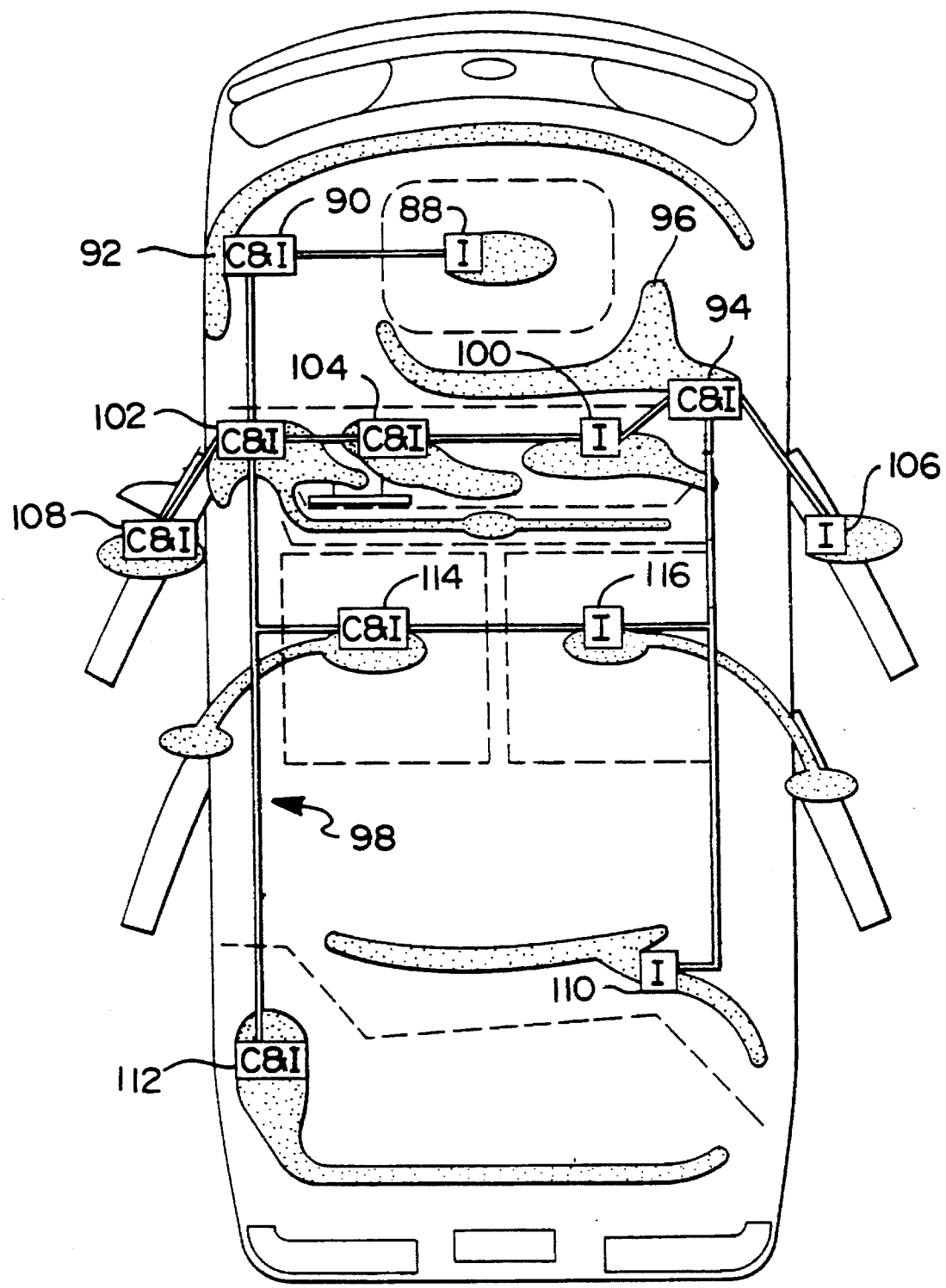
FIG. 7 is a diagrammatic plan view of a vehicle incorporating the control system of the present invention illustrating representative geographic control zones.

FIG. 7 graphically illustrates a representative vehicle control system constructed in accordance with the present invention. Although there are typically three (3) locational zones associated with a vehicle (engine compartment, passenger compartment, and trunk compartment), it is often useful to identify a number of additional zones relative to the location and density of control systems and accessories. For example, the instrument panel may be considered a separate zone between the passenger compartment and the engine compartment due to the large number of sensors and actuators positioned in that area. Likewise, the vehicle doors may be considered separate zones due to the actuator and sensor density. In addition, it may be desirable to partition a particular geographic zone, such as the instrument panel, into a number of zones based on the functional or geographical location of the various components.

In the representative application illustrated in FIG. 6, a combination module 90 is connected to various sensors and actuators located within a particular geographic zone 92 via eighty (80) conductors. Similarly, combination module 94 is connected to corresponding actuators and sensors in another geographic zone 96 via sixty-eight (68) conductors. Combination modules 90 and 94 can communicate with modules located in various other geographic zones, such as interface module 88, since they are connected to a vehicle trunkline, indicated generally by reference numeral 98. This arrangement would replace one-hundred-fifty-seven (157) intrazonal conductors and one-hundred-forty-seven (147) interzonal conductors used to implement a conventional control system with a conventional wiring harness.

Similarly, a conventional system using two-hundred-thirty-seven (237) intrazonal conductors and two-hundred-twenty-nine (229) interzonal conductors at the instrument panel may be replaced by an interface module 100 and combination modules 102 and 104. This requires only fifty-eight (58), eighty-seven (87), and one-hundred-five (105) conductors, respectively. The multiplexing capability of this system allows combination module 104 to include conductors which replace seventeen (17) interzonal and fourteen (14) intrazonal conductors required in the roof section of the passenger compartment for a conventional control system.

With continuing reference to FIG. 7, in the preferred embodiment, interface module 106 is mounted within the right front door and communicates with twenty-two (22) actuators or sensors through dedicated conductors. Combination module 108 is mounted within the left front door and communicates with thirty-three (33) directly connected sensors or actuators in addition to functioning as a redundant back-up controller to combination module 102. Alternatively, various other combination modules or controller modules may be utilized to provide parallel processing capabilities.

Combination module 94 is coupled by vehicle trunkline 98 to interface module 110 which is connected to various sensors and actuators using eighty-one (81) conductors. This replaces one-hundred-eighty (180) interzonal conductors at the rear of the passenger compartment and sixty-nine intrazonal conductors at the rear package tray in a conventional system. In a similar fashion, combination module 112 is coupled to sensors and actuators using eighty-nine (89) conductors at the trunk and rear light panel of the vehicle which replaces ten (10) interzonal and sixty-three (63) intrazonal conductors of a conventional system.

As also shown in FIG. 7, combination module 114 may provide control of the driver's seat and the left rear door window and lock. Similarly, an interface module 116 may provide control signals to the passenger's seat and right rear door. This arrangement replaces sixty-five (65) intrazonal conductors and one-hundred-eighty-one (181) interzonal conductors with only fifty-one (51) conductors coupled to various sensors and actuators.

It should be apparent that the exact number of conductors required depends upon the particular number and placement of various generic control modules for each individual application. However, a control system constructed in accordance with the present invention requires fewer conductors for a particular vehicle than would be required by a conventional control system employing point-to-point wiring.

Having thus described important structural and operational features of the present invention, it will be understood that the control system according to the present invention provides interfacing between sensors, actuators, and generic control modules located at selected locations about a vehicle via a vehicle trunkline. The controller modules and combination modules may control and operate a plurality of sensors and actuators located in distinct geographic zones of the vehicle. The signals to be delivered to a particular actuator or collected from a particular sensor may originate/terminate at any of the controller modules or combination modules programmed to perform a particular control function. This distributed computation of control functions and multiplexed communications reduce the number of discrete conductors necessary while increasing the utilization of processing resources.

It should be understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method for performing a control function in a vehicle having a plurality of sensors and actuators, a trunkline for providing power distribution and at least one communication channel throughout the vehicle, a first control module coupled to the trunkline and the plurality of sensors and actuators, and at least one additional control module coupled to the trunkline, the method comprising:

locating the first control module proximate to the plurality of sensors and actuators so as to reduce point-to-point connection lengths; and distributing the control function among the first control module and the at least one additional control module based on a required response time of the control function.

2. The method of claim 1 wherein the step of distributing the control function comprises:

dividing the control function into a first group of tasks to be processed algorithmically by the at least one additional control module so as to generate at least one control command and a second group of tasks for performing the at least one control command.

3. The method of claim 2 wherein the step of distributing the control function further comprises:

executing a first predetermined set of calculations within the at least one additional control module to generate at least one control command based on signals received from at least one of the plurality of sensors and actuators;

communicating the at least one control command to the first control module; and executing a second predetermined set of calculations within the first control module to perform the at least one control command.

4. The method of claim 3 wherein the step of executing a second predetermined set of calculations comprises:

generating a signal based on the at least one control command; and relaying the signal to at least one of the plurality of sensors and actuators.

5. A control system for performing a plurality of control functions in a vehicle having a plurality of input devices for generating signals indicative of a vehicle condition and a plurality of output devices for performing a control task in response to a signal, the system comprising:

a first control module proximately located and coupled to at least one of the plurality of input devices and at least one of the plurality of output devices, the first control module including means for receiving a control command, means for transforming the control command to output signals compatible with the at least one output device, means for receiving an input signal from the at least one input device, and means for transforming the input signal for transmission;

at least one additional control module having means for receiving signals from the first control module, means for storing data representative of the received signals, means for processing a predetermined instruction set stored in a memory to generate a control command based on the instruction set and the received signals, and means for transmitting the control command to the first control module, wherein each of the plurality of control functions is separated into a first group of tasks and at least one additional group of tasks based on a required response time of the control function and wherein the first control module performs the first group of tasks and the at least one additional control module performs the at least one additional group of tasks;

means for distributing power to the plurality of input devices, the plurality of output devices, the first control module, and the at least one additional control module; and means for communicating signals between the first control module and the at least one additional control module.

6. The control system of claim 5 wherein the vehicle includes a plurality of geographic zones and wherein the first control module is located in a first geographic zone and the at least one additional control module is located in a second geographic zone.

7. The control system of claim 5 wherein the means for distributing power and the means for communicating signals comprises a single trunkline.

8. The control system of claim 7 wherein the trunkline comprises:

a conductor for distributing electrical power; and a plurality of signal line pairs.

9. The control system of claim 7 wherein the means for distributing power and the means for communicating signals further includes a plurality of connectors for coupling the first control module and the at least one additional control module to the single trunkline.

10. An electrical control system for performing a plurality of control functions each being separated into a first group of tasks and at least one additional group of tasks based on a required response time of the control function in a vehicle having a plurality of sensors for generating signals indicative of a vehicle condition and a plurality of actuators for performing a control task in response to a control command, the system comprising:

a plurality of control modules each including a communication network receiver/transmitter, means for transforming the control command to output signals compatible with at least one of the plurality of actuators, a plurality of signal converters for receiving an input signal from at least one of the plurality of sensors, means for transforming the input signal for transmission by the network receiver/transmitter, and means for performing a control command received from another control module of the plurality of control modules;

a communication network trunkline including means for distributing power and means for communicating signals among the plurality of control modules; and a plurality of connectors corresponding to the plurality of control modules for coupling each of the plurality of control modules to the trunkline.

11. The control system of claim 10 wherein the plurality of control modules are interchangeable.

12. The control system of claim 10 further comprising:

at least one interface module coupled to at least one proximately located sensor and at least one proximately located actuator, the interface module including a communication network receiver/transmitter, a dual-access memory, means for transforming a control command received from one of the plurality of control modules to output signals compatible with the at least one actuator, a plurality of configurable signal converters for receiving an input signal from the at least one sensor, and means for transforming the input signal for transmission by the network receiver/transmitter; and a connector for coupling the interface module to the trunkline.

13. The control system of claim 12 wherein each of the plurality of control functions is separated into a first group of tasks and at least one additional group of tasks based on a required response time of the control function and wherein the first group of tasks is performed by at least one of the plurality of control modules and the at least one additional group of tasks is performed by the at least one interface module.

14. The control system of claim 12 wherein the vehicle includes a plurality of geographic zones and wherein the interface module is located within a first geographic zone and the plurality of control modules are not located within the first geographic zone.

* * * * *